J. ANDERSON.
MACHINE FOR DECORATING PASTRY.
APPLICATION FILED FEB. 21, 1910.
961,090.
Patented June 14, 1910.
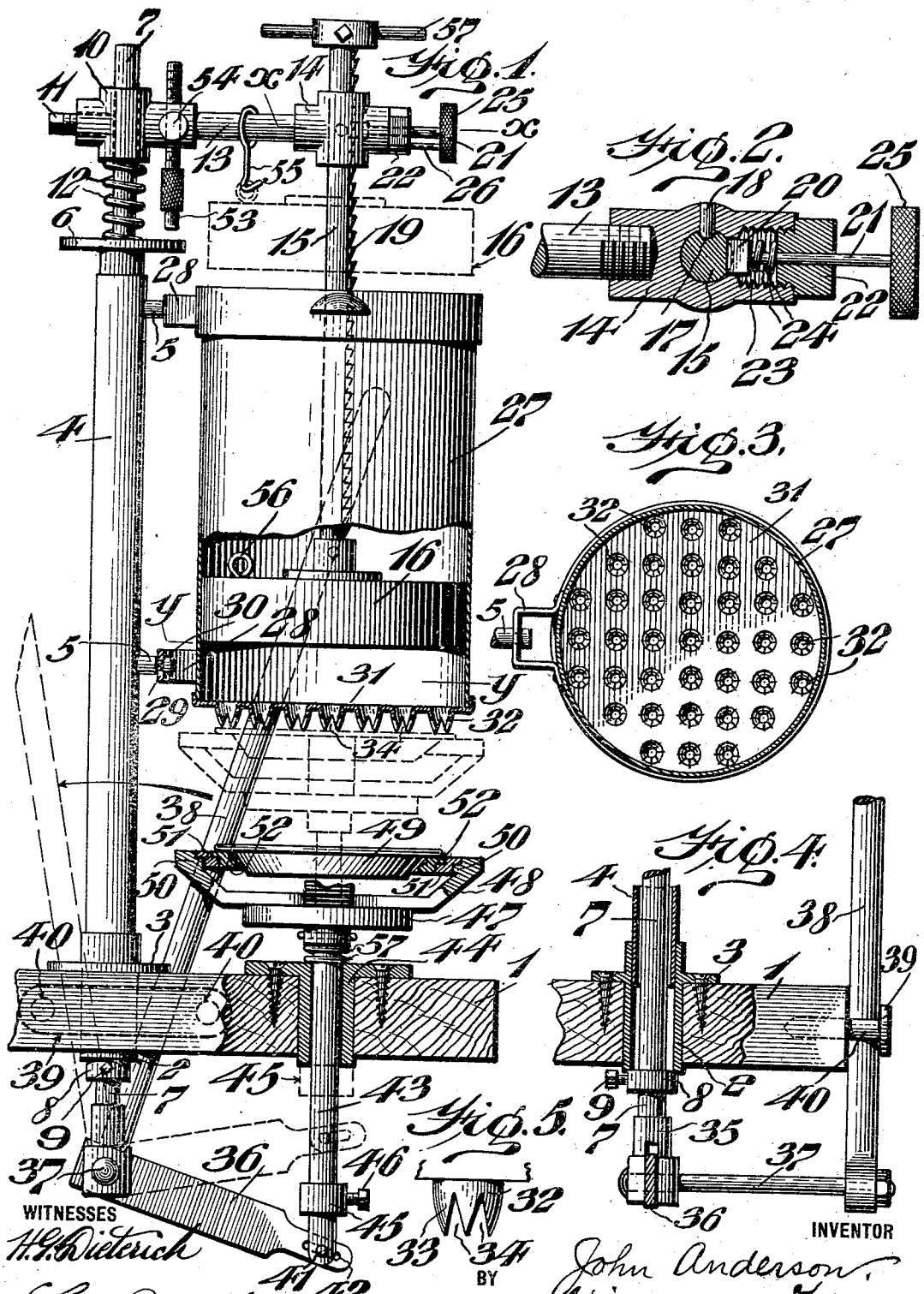
WITNESSES
INVENTOR
John Anderson
BY Wiedersheim & Fairbanks
ATTORNEYS

UNITED STATES PATENT OFFICE.

JOHN ANDERSON, OF PHILADELPHIA, PENNSYLVANIA, ASSIGNOR OF ONE-THIRD TO FRANK HARDART AND ONE-THIRD TO JOSEPH V. HORN, BOTH OF PHILADELPHIA, PENNSYLVANIA.

MACHINE FOR DECORATING PASTRY.

961,090.  Specification of Letters Patent.  Patented June 14, 1910.

Application filed February 21, 1910. Serial No. 545,040.

*To all whom it may concern:*

Be it known that I, JOHN ANDERSON, a citizen of the United States, residing in the city and county of Philadelphia, State of Pennsylvania, have invented a new and useful Machine for Decorating Pastry, of which the following is a specification.

My invention relates to a new and useful machine for decorating pastry and the like and consists of means for forcing a predetermined amount of the material from the container and in moving the pastry into position to receive the said material.

It further consists of novel means for moving the pastry to its proper position.

It further consists of novel means for carrying the follower guide and for providing a resilient support therefor and for the means which operates the support which carries the pastry.

It further consists of novel features of construction, all as will be hereinafter fully set forth.

Figure 1 represents a partial side elevation, and partial section of a machine for decorating pastry, embodying my invention. Fig. 2 represents a sectional view on line x—x, Fig. 1. Fig. 3 represents a top plan view of the tank or container with the plunger removed. Fig. 4 represents a partial elevation and partial sectional view of a portion of the mechanism in detached position. Fig. 5 represents a side elevation of one of the discharge guides on an enlarged scale.

Similar numerals of reference indicate corresponding parts in the figures.

Referring to the drawings: I have found in practice, that in the decoration of pastry, it is of advantage to be able to apply the decoration thereto in a predetermined amount and in regular order so that the appearance of the pastry is improved and a predetermined amount of the material will be applied in each instance.

In the drawings, I have shown a construction which I have found operates successfully, in practice, but it will be understood that changes may be made in the construction, the arrangement of the parts may be varied and other instrumentalities may be employed, which will come within the scope of my invention and I do not therefore, desire to be limited in every instance, to the exact form as herein shown and described, but desire to make such changes as may be necessary.

It will be understood that while I have shown and will describe my invention as in use for applying meringue to pies, it will be evident that the same is adapted for use in applying icing, chocolate or other suitable material to pastry as may be desired.

1 designates the frame for the machine in an opening in which I mount, in the present instance, a tube 2 having a flange 3 thereon, through which the fastening means is adapted to be passed in order to secure the tube 2 firmly to the frame 1. Carried and held by the tube 2 is a hollow standard or pipe 4 which extends upwardly a suitable distance and is provided at suitable points thereon with the headed pins 5.

6 designates a disk or plate which is connected with or forms part of the pipe 4.

7 designates a shaft which passes through the tube 2 and the pipe 4, extending a suitable distance beyond the top and bottom of the same, and on which I mount a collar 8, which is adjustable thereon by means of the set screw 9, whereby the position of said collar can be regulated in order to control the upward movement of the shaft 7, it being noted that the collar 8 abuts the end of the tube 2 in the normal position of the shaft 7 as will best be understood from Figs. 1 and 4.

10 designates a sleeve adjustably mounted on said shaft 7 which is adapted to be held in its adjusted positions by means of a set screw 11. Bearing against said sleeve is the spring 12 which in the present instance, surrounds the shaft 7, and at its opposite end, abuts the plate 6, whereby said spring serves to hold said sleeve 10 and shaft 7 normally in elevated position, causing the collar 8 to be held normally against the tube 2, said spring 12 thus serving as a resilient support for the shaft 7 and for the parts carried thereby.

13 designates an arm suitably carried by the sleeve 10 which arm carries a guide 14 provided with a suitable opening in which is seated and movable, a shaft 15 of a follower or plunger 16, said shaft 15 being provided with a suitable groove 17 in one side thereof, in which is seated an end of a pin 18 carried by the guide 14, whereby it will be understood that the shaft 15 is prevented from rotary movement but vertical movement is permitted.

19 designates teeth or a ratchet on the shaft 15, which are adapted to be engaged by a dog or pawl 20 movably supported in the guide 14 in the present instance carried on the rod 21, which is movably carried by a nut 22, the latter being in threaded engagement with the wall of an opening 23, in the guide 14 and said pawl having a spring 24 in engagement therewith, which is also in engagement with the nut 22 whereby said pawl 20 is normally held in position to engage with the teeth 19 on the shaft 15, to force down the follower when the guide is lowered and to prevent the upward movement thereof until the said pawl is removed from the path of said teeth 19.

25 designates a head carried by the rod 21 which can be grasped by the operator, overcoming the tension of the spring 24 for removing the pawl 20 from engagement with the teeth 19 and said head 25 also carrying a pin 26 which is adapted to enter an opening in the nut 22 for preventing improper rotation of the pawl 20 and adapted to hold the same in proper position, to engage with the teeth 19.

27 designates a container or tank in which, the follower or plunger 16 is adapted to move, said tank in the present instance, being provided with the ears 28 at suitable points thereon, said ears being provided with bearings 29 adapted to receive the headed pins 5, carried by the pipe 4, whereby it will be understood that the said container or tank 27 is suitably held at a position above the frame 1, but can be easily removed for cleaning, etc. by raising the said container to remove the bearings 29 from engagement with the headed pin 25. In the present instance, I have shown the headed pin as provided with a neck 30 which is adapted to receive the wall of the bearings 29 in order to properly hold the container or tank 27 in position. In the present instance, I have provided a plate 31, to form the bottom of the container 27, which is adapted to be connected therewith or secured to the tank or container in any suitable or desired manner and which is provided with a plurality of discharge tubes or guides 32 for permitting the material to pass therefrom. In the present instance, the discharge guides are shown as consisting of a plurality of teeth 33 having the inverted V-shaped space or opening 34 therebetween, the walls of said teeth being suitably curved in order to provide a narrow discharge opening and in order that the material when forced through the guide, will be deposited upon the pastry, etc. in the form of a star.

It will be understood that any suitable shape may be employed for the discharge guides in order to make the design upon the pastry such as is desired.

In the present instance, I have shown the shaft 7 provided with a yoke 35 which is adapted to receive and seat an arm 36 which is in suitable connection with the bolt 37, which is also connected with the operating lever 38, the same being guided in its movement by a plate 39 carried by the frame 1 and connected therewith, in the present instance, by pins 40 which serve as stops, if desired, for the operating lever 38 in its movement.

41 designates a pin movable in a slot 42 in the arm 36, said pin serving to connect said arm 36 with a movable rod 43 which passes through a suitable guide 44, carried by the frame 1, said rod 43 having a collar 45 thereon, adjustably connected therewith by a set screw 46 and said rod carrying the disk 47 which serves to carry a frame or support 48 which supports the pastry plate such as a pie plate 49, said frame 48 in the present instance, having a lip 50 thereon which is adapted to receive a ring 51 and support the same, in order to accommodate a smaller plate than could be carried by the frame 50, said ring 51 also having means for supporting a second ring 52 which will carry a still smaller plate as will be evident, it being understood that the said rod 43 and frame or support 48 are suitably positioned beneath the container or tank 2, in order that the pastry plate will be in suitable position beneath the container and so that when elevated the pastry is brought into a position adjacent the discharge guides 32.

53 designates a stop adjustably carried by the sleeve 10, in the present instance, by means of the set screw 54, said stop being in suitable position when lowered to engage with the disk 6, carried by the pipe 4.

55 designates a hook carried by the arm 13 which is adapted to engage with an eye 56, on the follower or plunger 16, when it is desired to hold the same and the shaft 15 in elevated position.

57 designates a handle or other suitable means connected with the shaft 15 in order to be grasped by the operator for raising the follower 16.

The operation of the device is as follows: The meringue or other material is placed within the container or tank 27 and the follower 16 rests upon the upper surface thereof and is supported thereby and will exert a downward pressure thereupon, tending to force the same from the discharge guides 32. The pie plate is placed upon the support 48, or the rings, carried by the rod 43, said support being suitably arranged to receive the same and the stop 53 having been adjusted with respect to the plate 6, the operator grasps the operating lever 38 and moves the same over in the direction, indicated by the arrow in Fig. 1. This will rock the arm 36, through the medium of the bolt 37, to the position seen in dotted lines, Fig. 1, and will elevate the rod 43 and with it, the support 48 placing the pastry adjacent the openings of the discharge guides 32. At the same time the shaft 7 is slightly depressed until the stop 53 contacts with the plate 6 so that the pawl 20, in engagement with one of the teeth 19 on the shaft 15, forces down the latter and with it the follower 16 and a certain amount of the meringue will be forced from the discharge guides 32 upon the pastry. The operating lever is now returned to its normal position and another pie is placed upon the support, and the operation is repeated. By this means it will be understood that a regular design will result and a predetermined amount of the material will be deposited upon the pie.

It will be understood that the collar 8 acts to prevent the shaft 7 from being elevated beyond a predetermined point and that the collar 45 on the rod 43 acts as a stop therefor. It will also be noticed that the pawl 20 assists in the downward movement of the follower 16, and by reason of the engagement of the teeth 19 with the pawl 20 the upward movement of the follower 16 is prevented until the operator removes the pawl 20 from the path of the teeth 19, at which time the operator can raise the said follower 16 and shaft 15, as desired.

In order to form a cushioning for the pastry support, I provide a spring 57 which encircles the rod 43 and is adapted to contact with the guide 44 when the pastry support is in its lowermost position.

Having thus described my invention, what I claim as new and desire to secure by Letters Patent, is:—

1. In a device of the character stated, a container for the material, discharge guides therefor, a follower movable in said container, resiliently controlled means engaging with said follower, a support for the pastry, means for elevating said pastry support and for lowering the engaging means whereby the pastry is brought into position adjacent the discharges of said container and a suitable amount of material is forced therethrough.

2. In a device of the character stated, a container for the material, discharge guides therefor, a follower movable in said container, resiliently controlled means engaging with said follower, a support for the pastry, means for elevating said pastry support and for lowering the engaging means whereby the pastry is brought into position adjacent the discharges of said container, and a suitable amount of material is forced therethrough, and means for controlling the downward movement of said engaging means whereby the amount of the discharge is controlled.

3. In a device of the character stated, a container for the material, a follower movable therein, discharge guides for said container, means for forcing down said follower, a resilient support for said means, a support for the pastry, connections between said pastry support and the support for the forcing means, and means for actuating the parts whereby the pastry support is elevated and the follower is lowered.

4. In a device of the character stated, a container, discharge guides therefor, a support for said container, a follower movably mounted in said container, a shaft for said follower, a spring actuated pawl adapted to engage with said follower shaft, a shaft for supporting said pawl, a spring for normally holding said shaft in its elevated position, a stop for preventing improper downward movement of said shaft, a support for the pastry and a connection between said pastry support and said pawl shaft, whereby when said pastry support is elevated, the pawl shaft is lowered.

5. In a device of the character stated, a container, discharge guides therefor, a follower movably mounted in said container, means for preventing rotation of said follower, means engaging with said follower, a support for said engaging means, a stop for limiting the movement of said engaging means, a spring for normally holding said engaging means in elevated position, a pastry support, a connection between said pastry support and said engaging means, whereby when said pastry support is elevated, the engaging means is lowered, to lower the follower.

6. In a device of the character stated, a container, discharge guides therefor, means for supporting the container, a shaft movable in said supporting means, a spring for holding said shaft in its elevated position, a follower movably mounted in said container, a follower shaft, a guide carried by said first mentioned shaft, for said follower shaft, a ratchet on said follower shaft, a pawl normally in engagement with said follower shaft, discharge guides for said container, a pastry support, a connection between said pastry support and said first mentioned shaft, whereby, when said pastry support is elevated, the said shaft is lowered.

7. In a device of the character stated, a container, discharge guides therefor, a pipe serving as a support for said container, a shaft movable in said pipe, a sleeve adjustably mounted on said shaft, a spring bearing upon said sleeve and upon said pipe and serving as a resilient support for the shaft, a guide carried by said sleeve, a follower shaft movable in said guide, a ratchet on said follower shaft, a spring actuated pawl carried by said guide and normally in engagement with said ratchet, means for preventing rotation of said follower shaft, a pastry support, and connections between said pastry support and said shaft whereby when said pastry support is elevated, said shaft is lowered.

8. In a device of the character stated, a container, discharge guides therefor, a pipe serving as a support for said container, a shaft movable in said pipe, a sleeve adjustably mounted on said shaft, a spring bearing upon said sleeve and upon said pipe and serving as a resilient support for the shaft, a guide carried by said sleeve, the follower shaft movable in said guide, a ratchet on said follower shaft, a spring actuated pawl carried by said guide and normally in engagement with said ratchet, means for preventing rotation of said follower shaft, means for preventing improper movement of said pawl, a pastry support, and connections between said pastry support and said shaft whereby when said pastry support is elevated, said shaft is lowered.

9. In a device of the character stated, a container, discharge guides therefor, a pipe serving as a support for said container, a shaft movable in said pipe, a sleeve adjustably mounted on said shaft, a spring bearing upon said sleeve and upon said pipe and serving as a resilient support for the shaft, a guide carried by said sleeve, a follower shaft movable in said guide, a ratchet on said follower shaft, a spring actuated pawl carried by said guide and normally in engagement with said ratchet, means for preventing rotation of said follower shaft, a pastry support, connections between said pastry support and said shaft whereby when the pastry support is elevated, the shaft is lowered, and means whereby said support may be varied to accommodate different sizes of pie plates.

10. In a device of the character stated, a container having bearings, a pipe suitably supported and having pins thereon adapted to be seated in said bearings, a disk carried by said pipe, a shaft movably mounted in said pipe, a sleeve on said shaft, a spring bearing against said sleeve and said disk, an adjustable stop on said sleeve adapted to abut said disk, a guide carried by said sleeve, a follower shaft movable in said guide, a follower carried by said follower shaft, a ratchet on said follower shaft, a spring actuated pawl carried by said guide and normally engaging with said ratchet, means for preventing rotation of said follower shaft, means for preventing improper movement of said pawl, a rod movably mounted, a support on said rod, an arm forming a connection between said arm and said shaft, and means for operating said arm for elevating said support and for lowering said shaft.

11. In a device of the character stated, a container for the material, discharge guides for said container, a follower in said container, a support for the pastry, and means suitably connected to operate in the proper sequence, for imparting relative movement between said container and support whereby the latter and the discharge guides are brought toward each other and for imparting relative movement between said container and the follower whereby the material is forced from the container.

12. In a device of the character stated, a container for the material, a discharge guide for said container, a follower, a support for the pastry, and means for actuating the parts in suitable sequence whereby the pastry support and discharge guides are brought into proper position with respect to each other and a desired amount of material is forced from the container.

JOHN ANDERSON.

Witnesses:
WM. CANER WIEDERSEIM,
C. D. McVAY.